(12) United States Patent
Falk et al.

(10) Patent No.: US 10,310,360 B2
(45) Date of Patent: Jun. 4, 2019

(54) FLASH TUBE PROVIDING A FLAT PEAK SYNCHRONIZED OUTPUT

(71) Applicant: PROFOTO AB, Sundbyberg (SE)

(72) Inventors: Anton Falk, Huddinge (SE); Ulf Carlsson, Täby (SE); Carl Johan Grubbström, Saltsjö-boo (SE)

(73) Assignee: PROFOTO AB, Sundbyberg (SE)

( * ) Notice: Subject to any disclaimer, the term of this patent is extended or adjusted under 35 U.S.C. 154(b) by 0 days.

(21) Appl. No.: 15/555,240

(22) PCT Filed: Feb. 25, 2016

(86) PCT No.: PCT/SE2016/050142
§ 371 (c)(1),
(2) Date: Sep. 1, 2017

(87) PCT Pub. No.: WO2016/140610
PCT Pub. Date: Sep. 9, 2016

(65) Prior Publication Data
US 2018/0052384 A1  Feb. 22, 2018

(30) Foreign Application Priority Data
Mar. 2, 2015  (SE) ..................... 1550240

(51) Int. Cl.
*G03B 15/05* (2006.01)
*H01T 1/22* (2006.01)
(Continued)

(52) U.S. Cl.
CPC .............. *G03B 15/05* (2013.01); *H01J 1/30* (2013.01); *H01J 11/28* (2013.01);
(Continued)

(58) Field of Classification Search
CPC ............................................. G03B 2215/0578
See application file for complete search history.

(56) References Cited

U.S. PATENT DOCUMENTS 3,849,690 A   11/1974  Cosco et al.
4,602,194 A   7/1986   Numata
(Continued)

FOREIGN PATENT DOCUMENTS

CN  1922713 A    2/2007
CN  103748512 A  4/2014
(Continued)

OTHER PUBLICATIONS

International Search Report in PCT Application No. PCT/SE2016/050142, dated Jun. 29, 2016 in 4 pages.
(Continued)

*Primary Examiner* — Nimeshkumar Patel
*Assistant Examiner* — Jacob R Stern
(74) *Attorney, Agent, or Firm* — Knobbe, Martens, Olson & Bear, LLP

(57) ABSTRACT

Flash tubes for photographic use, in particular, a flash tube is adapted to provide a light output adapted to FP-sync, Flat Peak. The flash tube includes a length of glass tubing enclosing a gas for use in the flash tube, a cathode inside a first end part of glass tubing and an anode inside a second end part of glass tubing. The cathode includes an element that helps to ionize the gas that is wound around the cathode, such that a spark stream starts from the upper part of the cathode and is prevented from spreading down wards on the cathode and changing the arc length during the light output adapted to FP-sync.

20 Claims, 5 Drawing Sheets

(51) Int. Cl.
 *H01T 1/24* (2006.01)
 *H01J 11/28* (2012.01)
 *H05B 41/32* (2006.01)
 *H01J 61/54* (2006.01)
 *H01J 61/90* (2006.01)
 *H01J 1/30* (2006.01)
 *H01J 61/067* (2006.01)

(52) U.S. Cl.
 CPC ........ *H01J 61/0672* (2013.01); *H01J 61/547* (2013.01); *H01J 61/90* (2013.01); *H01T 1/22* (2013.01); *H01T 1/24* (2013.01); *H05B 41/32* (2013.01); *G03B 2215/0575* (2013.01); *G03B 2215/0578* (2013.01)

(56) References Cited

U.S. PATENT DOCUMENTS

| | | | | |
|---|---|---|---|---|
| 5,077,505 | A | * | 12/1991 | Ekkelboom ............... H01J 5/32 313/318.12 |
| 5,911,919 | A | * | 6/1999 | Billings ................... H01B 1/06 252/515 |
| 6,137,228 | A | * | 10/2000 | Aizawa ............... H01J 61/0732 313/491 |
| 9,748,087 | B2 | | 8/2017 | Kase et al. |
| 2005/0264213 | A1 | * | 12/2005 | Dambacher ......... H01J 61/0732 313/631 |
| 2011/0037385 | A1 | * | 2/2011 | Nishimura .......... H01J 61/0732 313/631 |
| 2014/0217884 | A1 | | 7/2014 | Falk et al. |
| 2015/0249003 | A1 | * | 9/2015 | Kase ....................... H01J 61/90 362/263 |

FOREIGN PATENT DOCUMENTS

| | | |
|---|---|---|
| CN | 104882353 A | 9/2015 |
| DE | 19812298 A1 | 10/1998 |
| JP | 2012-069472 A | 4/2012 |
| SE | 535834 A1 | 1/2013 |
| SU | 406241 A1 | 11/1973 |

OTHER PUBLICATIONS

International Written Opinion in PCT Application No. PCT/SE2016/050142, dated Jul. 1, 2016 in 5 pages.
Extended European Search Report issued in European Patent Application No. 16759211.2, dated Dec. 19, 2018, in 6 pages.
Office Action issued in Chinese Patent Application No. 201680013154.1, dated Jan. 28, 2019, with its English translation, in 15 pages.

* cited by examiner

Fig. 1 - PRIOR ART

FLASH TUBE PROVIDING A FLAT PEAK SYNCHRONIZED OUTPUT

CROSS-REFERENCE TO RELATED APPLICATIONS

This application is the U.S. National Phase under 35 U.S.C. § 371 of International Application No. PCT/SE2016/050142, filed Feb. 25, 2016, titled FLASH TUBE PROVIDING A FLAT PEAK SYNCHRONIZED OUTPUT, which claims priority to SE Patent Application No. 1550240-4, filed Mar. 2, 2015, the entirety of each of which is hereby expressly incorporated by reference herein.

TECHNICAL FIELD

The present disclosure relates to a flash tube adapted to provide a light output adapted to FP-sync, Flat Peak.

BACKGROUND

FIG. 1 shows an example of a conventional flash tube 1 according to prior art having external triggering. The flash tube 1 comprises a glass envelope 2 enclosing a gas 3. One electrode 4, 5 is provided at each end inside the glass envelope 2, where the electrodes 4, 5 protrudes out of the glass envelope 2 and connects to two electrical connectors 4A, 5A. The two electrical connectors 4A, 5A are arranged to receive and apply a voltage between the two electrodes 4, 5. The two electrodes 4, 5 may be charged up to a suitable voltage level, V1, using e.g. a capacitor (not shown).

The flash tube 1 illustrated in FIG. 1 is externally triggered. This is performed by having the electrodes 4, 5 of the flash tube 1 charged up to a voltage level which is high enough to respond to a triggering event, but below the flash tube's self-flash threshold. Then, a high voltage pulse, which normally may be between 2000 and 150 000 V, is externally applied directly to or close to the glass envelope of the flash tube. This may also be referred to as a "trigger pulse". The flash tube 1 further comprises a material 8 applied to the electrode 5. This material helps to ionize the gas inside the glass envelope of the flash tube 1.

This short duration, high voltage pulse creates a rising electrostatic field, which ionizes the gas inside the glass envelope of the flash tube 1. The capacitance of the glass couples the trigger pulse into the glass envelope, where it exceeds the breakdown voltage of the gas surrounding one or both of the electrodes 4, 5, generating a plurality of spark streamers. The plurality of spark streamers will propagate randomly through the gas and via capacitance along the glass at a speed of about 1 cm in 60 ns, that is, around 170 km/s. It should be noted that a trigger pulse must have long enough duration to allow at least one of the plurality of random spark streamers generated to reach the opposite electrode, otherwise erratic triggering will occur. When at least one of the random spark streamers has bridged the electrodes, the charged-up voltage will discharge through the ionized gas, and cause a heating of the gas (e.g. xenon) to a high enough temperature for the emission of light, i.e. generate a flash.

In a camera, flash tube synchronization is defined as synchronizing the firing of the flash tube with the opening of the shutter admitting light to photographic film or image sensor. One type of flash tube synchronization is FP-sync, Flat Peak. FP-sync is used with flash tubes designed specifically for use with focal-plane shutters. A focal-plane shutter uses two shutter curtains that run horizontally or vertically across the image sensor plane. For slower shutter speeds, the first curtain opens, and after the required time with the shutter open, the second curtain closes the aperture in the same direction. Faster shutter speeds are achieved by the second curtain closing before the first one has fully opened. This results in a slit that travels across the image sensor. Faster shutter speeds simply require a narrower slit, as the speed of travel of the shutter curtains is not normally varied. Using this technique, modern SLR cameras are capable of shutter speeds of up to $1/2000$, $1/4000$ or even $1/8000$ s.

When using a focal plane shutter, although each part of the image sensor is exposed for the rated exposure time, the image sensor is exposed by a slit which moves across the image sensor in a time, the X-sync speed. The X-sync speed may be of the order of $1/250$ s. Although the exposure of each part of the image sensor may be $1/2000$ s, the last part of the image sensor is exposed later by the X-sync time than the first part of the image sensor. If the flash tube discharge for a shorter time than the X-sync speed only parts of the image sensor will be illuminated. Flash tubes that discharge during the entire X-sync time will result in that the entire image sensor will be illuminated even at higher shutter speeds. When the flash tube is discharged for a long time with constant energy required to illuminate the entire image sensor, the flash tube can be considered as a fixed light source.

However, a disadvantage with a flash tube that is designed for a discharge with a much larger energy and a shorter duration is that when the flash tube is discharged at a lower energy for a long time the spark stream will start from different places on the electrode 4. This result is that each flash that is generated is usually different from each other, that is, the emitted light from one flash often comprises a different colour temperature than a subsequent flash from the same flash tube 1.

Another disadvantage with a flash tube that is designed for a discharge with a much larger energy and a shorter duration is that when the flash tube is discharged for a long time the spark stream will spread downwards on the electrode and changing the arc length during the light output. When the spark stream spreads downwards on the electrode, the material 8 will also be damaged. Small pieces of the material 8 can also come lose if the spark stream is spread down to the material 8. These small pieces of material can damage the glass envelope. Another problem associated with the damage of the material 8 is that the material will loosen its capacity to help the gas to be ionized.

There is therefore a need for an improved solution for flash tubes, which solution solves or at least mitigates at least one of the above mentioned problems.

SUMMARY

It is understood by the inventor that it is highly desirable to provide a flash tube adapted to provide a light output adapted to FP-sync. It is also understood by the inventor that it is highly desirable to provide of flash tubes adapted to provide a light output adapted to FP-sync that will produce a constant light output characteristics and that will not be damaged from the a light output adapted to FP-sync.

This object is addressed by flash tubes for photographic use, in particular to a flash tube adapted to provide a light output adapted to FP-sync. The flash tube comprises a length of glass tubing enclosing a gas for use in the flash tube, a cathode inside a first end part of the glass tubing and an anode inside a second end part of the glass tubing. The cathode comprises an element that helps to ionize the gas that is wound around the cathode, such that a spark stream starts from the upper part of the cathode and is prevented from spreading down wards on the cathode and changing the arc length during the light output adapted to FP-sync.

Since the flash tube comprises an element that helps to ionize the gas that is wound around the cathode, the spark stream starts from the upper part and is prevented from spreading down wards on the cathode the arc length of the spark stream is not changed during the light output. Further since spark stream is not spread downwards, the cathode and the element are not damaged during the light output adapted to FP-sync.

BRIEF DESCRIPTION OF THE DRAWINGS

The above and other features and advantages of the present invention will become readily apparent to those skilled in the art by the following detailed description of exemplary embodiments thereof with reference to the accompanying drawings, wherein.

DESCRIPTION

Figure 1:
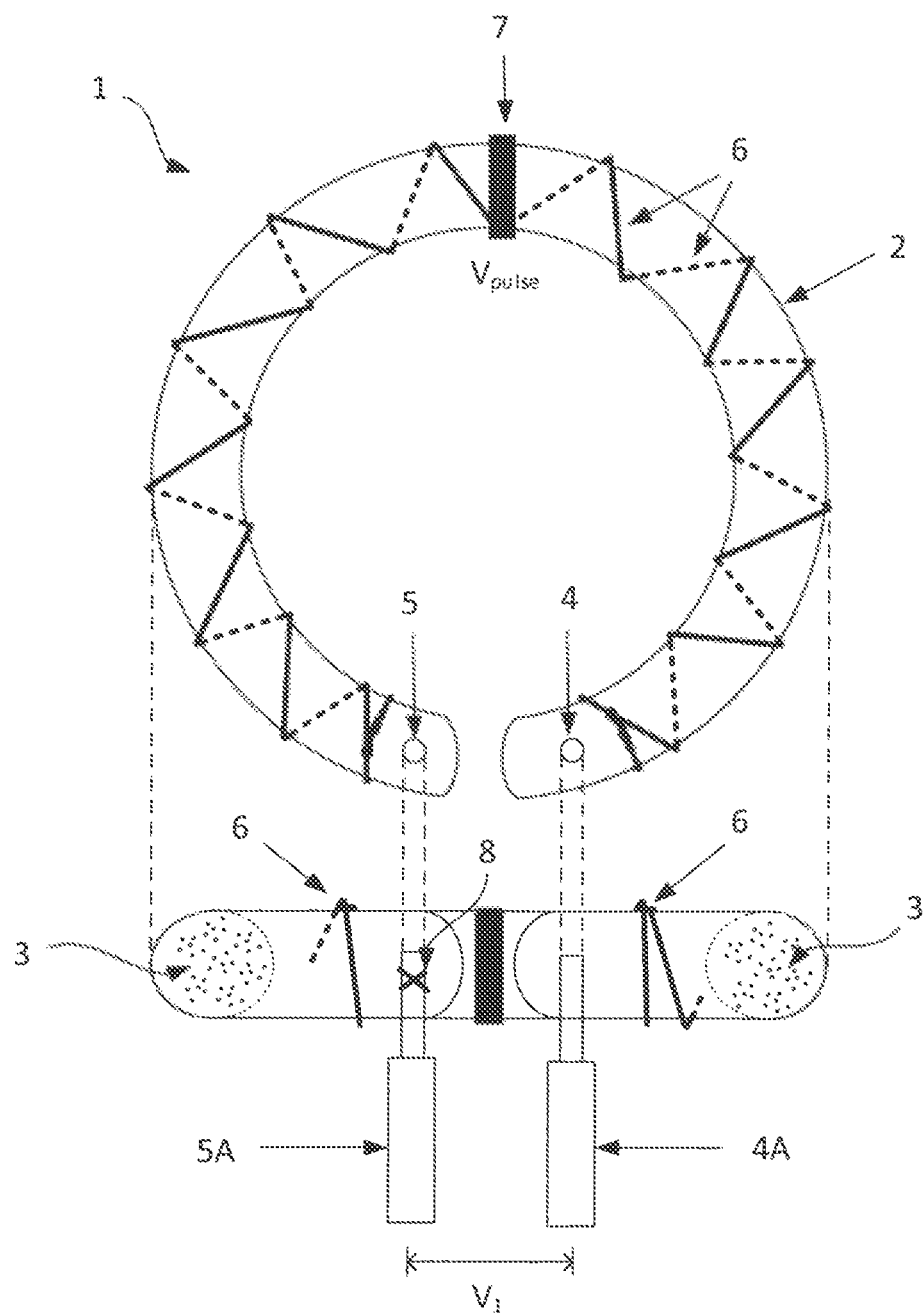
FIG. 1 schematically illustrates an example of a conventional flash tube 1 according to prior art having external triggering.

The figures are schematic and simplified for clarity, and they merely show details which are essential to the understanding of the invention, while other details have been left out. Throughout, the same reference numerals are used for identical or corresponding parts.

According to one aspect of the invention, it has been found that in conventional flash tubes such as, the flash tube 1 in FIG. 1, there is a problem with the conventional electrode that the spark stream that is created between the electrodes 4, 5 starts from different positions at the electrode 4. Pluralities of spark streams are often made of a number of spark streams that may be randomly started on the electrode 4 inside the glass envelope 21 of the flash tube 1. This results in that the spark stream spread down wards on the electrode 4. If the spark stream spread downwards on the electrode 4 the arc length during the light output adapted to FP-sync will also change. This results in different light output characteristics during the light output adapted to FP-sync. Another problem associated with the spark stream spreading downwards on the electrode 4 is that the spark stream will damage the electrodes 4 and also the material 8. Small pieces of the material 8 can also come lose if the spark stream is spread down to the material 8. These small pieces of material can damage the glass envelope. Another problem associated with the damage of the material 8 is that the material will loosen its capacity to help the gas to be ionized. Thus the flash tube 1 will lose its capacity to trigger. The spark stream in conventional flash tubes 1, such as the flash tube 1 in FIG. 1, are started at random positions at the electrode.

Thus, according to the invention, it was realized that the problems described above may be solved by a cathode 44 that comprises an element 50 that helps to ionize the gas that is wound around the cathode 44, such that a spark stream starts from the upper part 48 and is prevented from spreading down wards on the cathode 44 and change the arc length of the spark stream. The spreading of the spark stream further damages the cathode 44 during the light output adapted to FP-sync. It was also realized since the arc length was changed and the material 8 was damage in the prior art solutions that an element that helps to ionize the gas should be wound around the cathode 44. An advantage by winding the element that helps to ionize the gas around the cathode 44 it that the element 50 helps to ionize the gas effectively since the materials in the cathode 44 and in the element 50 are in physical contact which each other.

Figure 2:
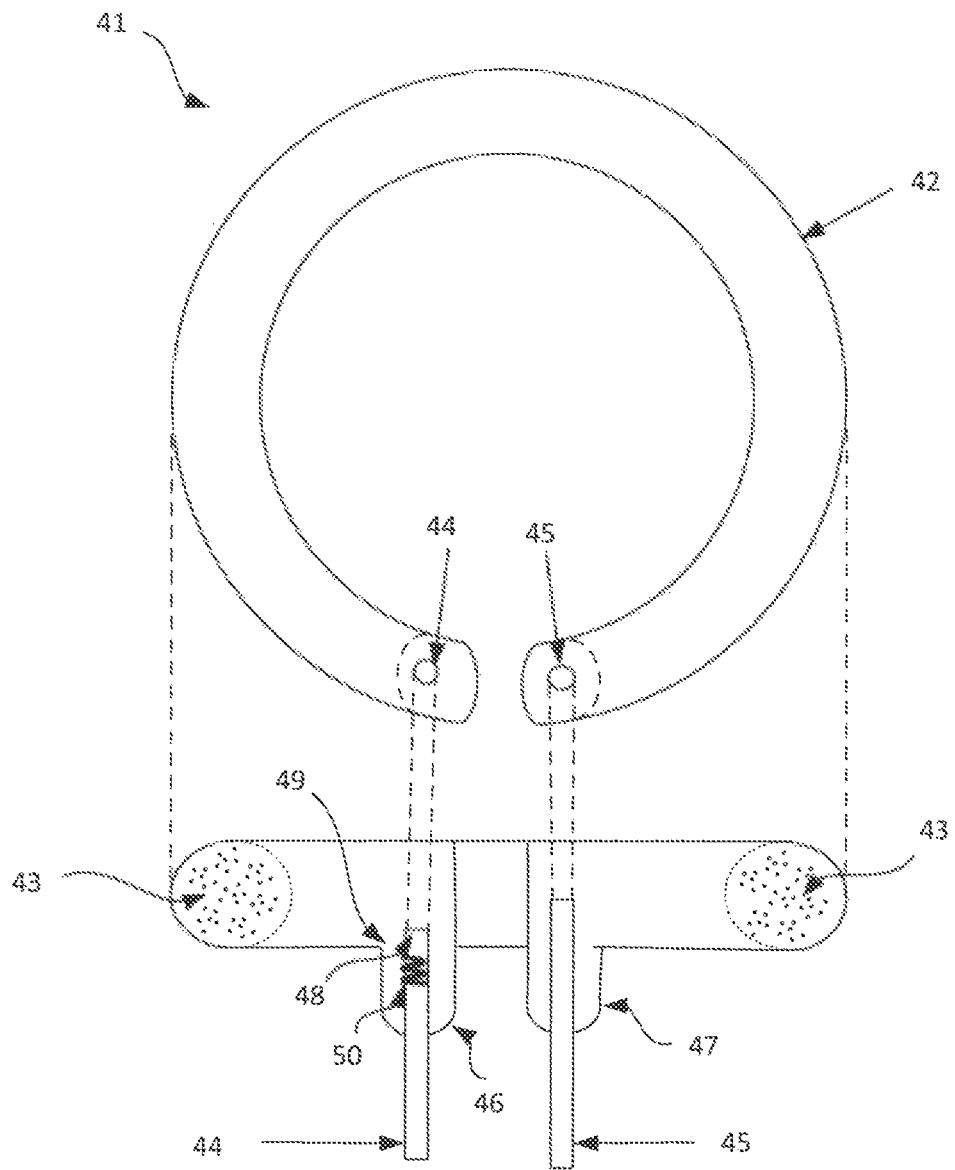
FIG. 2 schematically illustrates a flash tube according to an embodiment of the present disclosure.

FIG. 2 illustrates a flash tube 41 adapted to provide a light output adapted to FP-sync, Flat Peak according to one aspect of the presents disclosure. The upper part of FIG. 2 shows a view of the flash tube 41 from above, and the lower part of FIG. 2 shows a side-view of the flash tube 41. The flash tube 41 comprises a length of glass tubing 42 enclosing a gas 43. Although, the length of glass tubing is here described having a circular tube shape, it should be noted that the length of glass tubing 42 may be of many different shapes, such as, for example, straight tube shape, spiral shaped, U-shaped, helical shaped, ring shaped, etc. Therefore, this exemplary embodiment should not be construed as limiting to the invention in this respect. The gas 43 is a gas suitable for use in a flash tube, such as Xenon, Argon or Neon.

A cathode 44 is provided inside a first end part 46 of glass tubing 42. Further, an anode 44 is arranged inside a second end part 47 of glass tubing 42. According to an aspect of the present disclosure the cathode 44 comprises an element 50 that helps to ionize the gas that is wound around the cathode 44, such that a spark stream starts from the upper part 48 and is prevented from spreading down wards on the cathode 44 and change the arc length of the spark stream during the light output adapted to FP-sync. The cathode 44 and the anode 45 are arranged to receive and discharge a charged-up voltage over the cathode 44 and the anode 45. The cathode 44 and the anode 45 may be charged up to a suitable voltage level, V1, using e.g. a capacitor (not shown). Capacitor(s) and electrical connectors to the cathode 44 and the anode 45 may be provided in for example a conventional flash generator apparatus.

According to one aspect of the flash tube according to the present disclosure the element 50 is wound around the cathode 44 at least at the top of the cathode 44. An advantage by winding the element 50 around the cathode 44 at the top of the cathode is that the element 50 effectively ionizes the gas close to the top of the cathode 44. Thus is the spark stream started from the upper part 48 of the cathode 44 and is prevented from spreading down wards on the cathode 44 and change the arc length of the spark steam during the light output adapted to FP-sync.

According to another aspect of the present disclosure the element 50 is wound around the cathode 44 with an uneven pitch. The element 50 can according to one aspect of the present disclosure be unevenly wound around the cathode 44 in sections with different pitch. An advantage of winding the element 50 with different pitch around the cathode 44 is that the spark stream that starts to burn from the element 50 can continue to burn from the cathode 44 since there is more space between the turns of the element 50 at parts with loose pitch.

Figure 3:
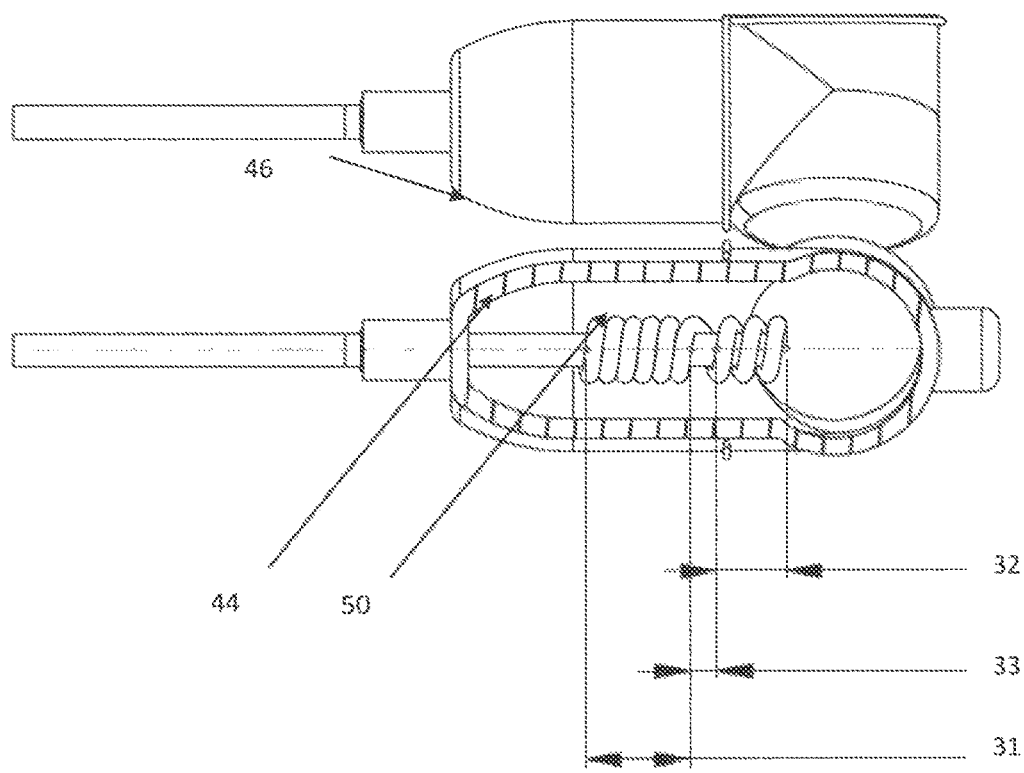
FIG. 3 illustrates a cross section view of the flash tube according to one aspect of the present disclosure.

FIG. 3 illustrates a cross section view of the flash tube 31 according to one aspect of the present disclosure. As illustrated in FIG. 3 according to one aspect of the present disclosure the flash tube comprises a first section 31 wherein the element 50 is wound around the cathode 44 with a tight pitch and a second section 32 where the element 50 is wound around the cathode 44 with a loose pitch. According to another aspect of the present disclosure the second section is closets' to the glass tubing 42.

An advantage by having the second section 32 closest to the glass tubing 42 is that the spark stream that starts to burn from the element 50 can continue to burn from the cathode 44 since there is more space between the turns of the element 50 at the second 32 section closest to the glass tubing 42. Thus the second section 32 with loose pitch further makes it possible for the spark stream to start and continue to burn from the upper part 48 of the cathode 44 and is prevented from spreading down wards on the cathode 44 and change the arc length of the spark stream during the light output adapted to FP-sync.

In yet another aspect of the present disclosure there is a gap 33 between the first section 31 with a tight pitch and the second section 32 with a loose pitch. An advantage by arranging the gap 33 between the first section 31 with tight pitch and the second section 32 with loose pitch is that the spark stream is further prevented from spreading down wards on the cathode 44 and changes the arc length of the spark stream during the light output adapted to FP-sync. This since the spark stream that starts to burn from the element 50 can continue to burn from the gap 33. In one exemplary embodiment of the flash tube 41 according to the present disclosure the gap 33 between the second section 32 and the first section 31 is between 0.5 to 2.5 mm. An advantage by having a gap 33 between 0.5 to 2.5 mm is that the spark stream is further prevented from spreading down wards on the cathode 44 that since the spark stream can continue to burn from the gap 33.

Figure 4:
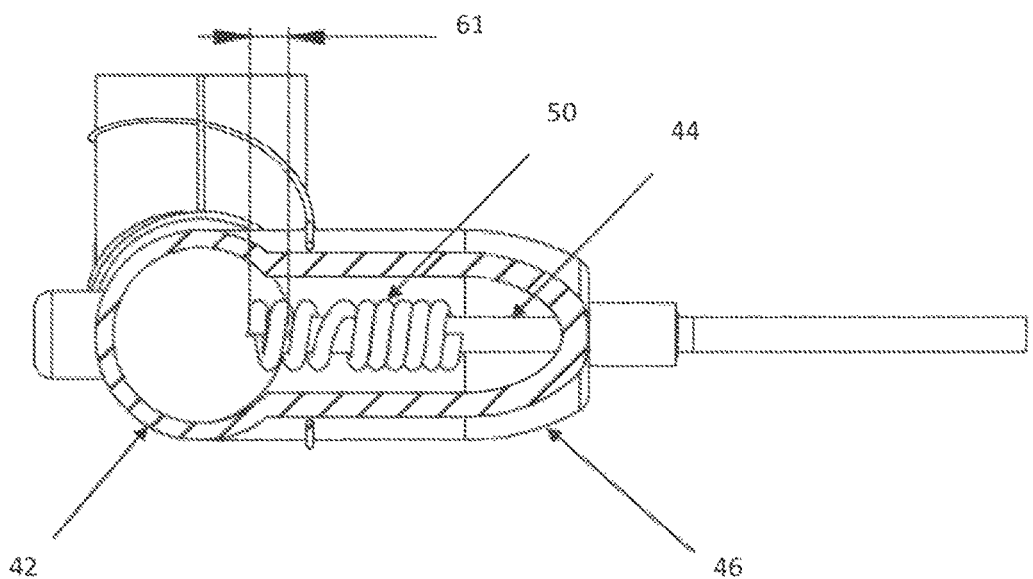
FIG. 4 illustrates a cross section view of the flash tube according to one aspect of the present disclosure.

FIG. 4 illustrates another cross section view of the flash tube 31 according to one aspect of the present disclosure. As illustrated in FIG. 4 according to one aspect of the present disclosure the protruding distance of the element 50 from the cathode 44 between 0.5 to 2 mm. An advantage by having a protruding distance of the element 50 from the cathode 44 between 0.5 to 2 mm is that the element effectively can ionize the gas 43 and further cause the spark stream to start from the top 48 of the cathode 48. Thus is the spark stream further prevented from spreading down wards on the cathode 44 and change the arc length of the spark stream.

According to yet another exemplary embodiment of the present disclosure the last turn of the element 50 ends away from the opening of the length of glass tubing 42. An advantage by arranging the last turn of the element 50 so it ends away from the opening of the length of glass tubing 42 is that it prevents the spark stream to burn from a fix point of the element 50. If the spark stream burns from a fix point of the element 50 is causes a change of the impedance which further causes a change in the light characteristics. According to yet another exemplary embodiment of the present disclosure the first end part 46 being substantially perpendicular to the length of glass tubing 42 and the second end part 47 being substantially perpendicular to the length of glass tubing 42.

Figure 5:
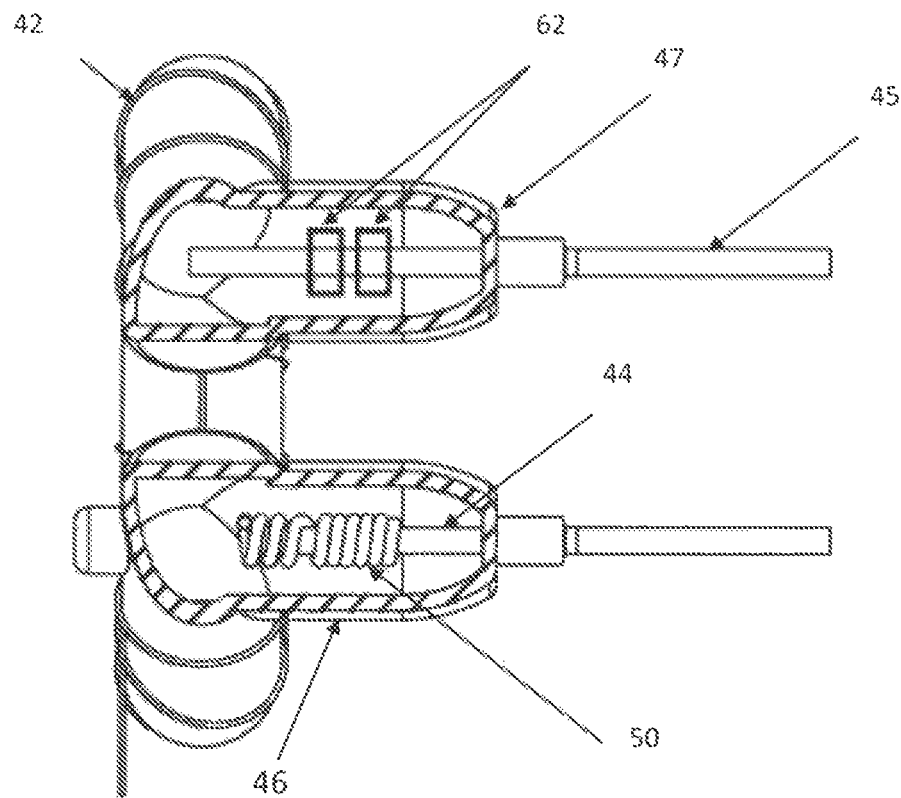
FIG. 5 illustrates a cross section view of the flash tube according to one aspect of the present disclosure.

FIG. 5 illustrates another cross section view of the flash tube 31 according to one aspect of the present disclosure. As illustrated according to yet another exemplary embodiment of the present disclosure the anode 45 comprises two getters placed inside the second end part 47 of the glass tubing 42.

According to yet another aspect of the present disclosure the cathode 44 is made of tungsten zirconium. An advantage with this is that it prevents the cathode 44 from sputtering. According to yet another aspect of the present disclosure, the cathode is made of tungsten. One embodiment discloses the element 50 made of molybdenum. An advantage of manufacturing the element 50 in molybdenum is that molybdenum can withstand extreme temperatures without significantly expanding or softening which makes it advantageous to use molybdenum in the element 50. In yet a further aspect of the present disclosure is an activator is applied on the molybdenum element 50. The activator comprises according to one aspect of the present disclosure barium.

The flash tube according to any of the preceding claim 1, wherein said cathode 44 maximum extends to a boundary between the first end part 46 and the length of glass tubing 42. According to this aspect the element 50 can protrude to the length of glass tubing 42. It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art.

What is claimed is:

1. A flash tube adapted to provide a light output adapted to FP-sync, Flat Peak, the flash tube comprising:
    a length of glass tubing enclosing a gas for use in the flash tube;
    a cathode fastened inside a first end part of the glass tubing;
    an anode fastened inside a second end part of the glass tubing; and
    an element arranged inside the first end part of the glass tubing and wound around the cathode, the element configured to facilitate gas ionization, such that a spark stream starts from an upper part of the cathode and is prevented from spreading downwards on the cathode and changing the arc length during the light output adapted to FP-sync,
    wherein the element is unevenly wound around the cathode in sections with different pitch,
    wherein the element comprises a first section wherein the element is wound around the cathode with a tight pitch and a second section wherein the element is wound around the cathode with a loose pitch relative to the tight pitch of the first section, and
    wherein there is a gap provided between the first section and the second section where the element is wound around at least a part of the cathode with an even looser pitch relative to the loose pitch of the second section.

2. The flash tube according to claim 1, wherein the element is wound around the cathode at least at a top of the cathode.

3. The flash tube according to claim 1, wherein the element is wound around the cathode with an uneven pitch.

4. The flash tube according to claim 1, wherein the second section is closest to the glass tubing relative to the first section.

5. The flash tube according to claim 1, wherein a last turn of the element ends away from an opening of the length of glass tubing.

6. The flash tube according to claim 1, wherein a distance between the second section and the first section is approximately 1.5 mm.

7. The flash tube according to claim 1, wherein the element protrudes from the cathode.

8. The flash tube according to claim 7, wherein the element has a maximum protruding distance from the cathode of 2 mm.

9. The flash tube according to claim 1, wherein the cathode comprises zirconium.

10. The flash tube according to claim 1, wherein the cathode comprises tungsten.

11. The flash tube according to claim 1, wherein the element comprises molybdenum.

12. The flash tube according to claim 11, wherein an activator is applied on the molybdenum element.

13. The flash tube according to claim 12, wherein the activator comprises barium.

14. The flash tube according to claim 1, wherein said cathode at maximum extends to a boundary between the first end part and the length of glass tubing.

15. The flash tube according to claim 1, wherein the first section and the second section are formed from a monolithic material of the element.

16. A flash tube adapted to provide a light output, the flash tube comprising:
    a length of glass tubing enclosing a gas for use in the flash tube;
    a cathode fastened inside a first end part of the glass tubing;
    an anode fastened inside a second end part of the glass tubing; and
    an element wound around the cathode, the element configured to facilitate gas ionization for providing the light output,
    wherein the element is unevenly wound around the cathode in sections with different pitch,
    wherein the element comprises a first section wherein the element is wound around the cathode with a tight pitch and a second section wherein the element is wound around the cathode with a loose pitch relative to the tight pitch of the first section, and
    wherein the first section and the second section are formed from a monolithic material of the element.

17. The flash tube according to claim 16, wherein the element protrudes from the cathode inside the glass tubing.

18. A flash tube adapted to provide a light output, the flash tube comprising:
    a length of glass tubing enclosing a gas for use in the flash tube;
    a cathode fastened inside a first end part of the glass tubing;
    an anode fastened inside a second end part of the glass tubing; and
    an element wound around the cathode, the element configured to facilitate gas ionization for providing the light output,
    wherein the element is unevenly wound around the cathode in sections with different pitch,
    wherein the element comprises a first section wherein the element is wound around the cathode with a tight pitch and a second section wherein the element is wound around the cathode with a loose pitch relative to the tight pitch of the first section, and
    wherein a gap is provided between the first section and the second section without cross sections of the element being in contact at the gap.

19. The flash tube according to claim 18, wherein first section and the second section are formed from a monolithic material of the element.

20. The flash tube according to claim 18, wherein the element is wound around at least a part of the cathode at the gap with an even looser pitch relative to the loose pitch of the second section.

* * * * *